United States Patent
Cazabon et al.

(10) Patent No.: US 7,523,406 B2
(45) Date of Patent: Apr. 21, 2009

(54) DYNAMIC PARAMETER INTERFACE

(75) Inventors: Rodolfo Jose Cazabon, San Francisco, CA (US); Neil Hazzard, Southampton (GB)

(73) Assignee: Autodesk Inc., San Rafael, CA (US)

( * ) Notice: Subject to any disclaimer, the term of this patent is extended or adjusted under 35 U.S.C. 154(b) by 676 days.

(21) Appl. No.: 10/894,755

(22) Filed: Jul. 19, 2004

(65) Prior Publication Data

US 2005/0017973 A1    Jan. 27, 2005

Related U.S. Application Data

(60) Provisional application No. 60/489,326, filed on Jul. 22, 2003.

(51) Int. Cl.
 *G06F 3/00* (2006.01)
(52) U.S. Cl. .................................. 715/771; 715/964
(58) Field of Classification Search .................. 715/771, 715/773, 848, 849, 964; 345/426, 581, 582
See application file for complete search history.

(56) References Cited

U.S. PATENT DOCUMENTS 6,496,190 B1 * 12/2002 Driemeyer et al. .......... 345/619
7,062,722 B1 *  6/2006 Carlin et al. ................ 715/850
7,176,917 B1 *  2/2007 Morgan et al. .............. 345/426
2003/0011637 A1 *  1/2003 Boudier ...................... 345/771

OTHER PUBLICATIONS

Thomas Driemeryer and Rolf Herken, Mental Ray Phenomena, U.S. Appl. No. 60/051,507, pp. 1-29.*
Paint Shop Pro 7 Tutorials "Paint Brush Tool," Apr. 29, 2004 <http://www.jasc.com/support/learn/tutorials/archive/paintshoppro/paint-brush.asp? pg=1>.
Paint Shop Pro 7 Tutorials "Flood Fill Tool," Apr. 29, 2004 <http://www.jasc.com/support/learn/tutorials/archive/paintshoppro/floodfilltool.asp? pg=1>.
Software Review: "JASC Paint Shop Pro 7: Anniversary Edition," Apr. 29, 2004 <http://www.edutainingkids.com/reviews/jascpaintshopproreview.html>.
Paint Shop Pro 7 Review, Apr. 29, 2004 <http://multimedian.com/pca/reviews/psp.html>.

* cited by examiner

*Primary Examiner*—Dennis Bonshock
(74) *Attorney, Agent, or Firm*—Patterson & Sheridan, LLP

(57) ABSTRACT

A method is disclosed for dynamically provisioning a user interface for a shader. Signals received from a user input device are interpreted to select the shader. Source code including program instructions for the shader is parsed to identify user-controllable parameters and preferred user interface components that are then displayed within a user interface. Additional user input signals are obtained based on user interactions with the user interface components and the shader is executed to display the effect of the user interactions.

16 Claims, 17 Drawing Sheets

```
                        GlazedPottery.fx

// Glazed Pottery Shader

// NOTE:
// The glazed surface consists of 2 layers -
// 1. A polished layer of glazing on top (contributes a smooth
// specular reflection and an environment-mapped reflection with
// a freznel term) and
// 2. a coloured ceramic layer with a fine texture underneath // Parameters
                                              ←—1502
color SurfaceColor
<       string UIType = "COLORBROWSER2";
        string name = "darkBrown";  ←————1503    ←—1501
        string UINAME = "Color";
>;                                       ←—1504 float Reflectivity
<       string UIType = "INTSLIDER";
        string name = "47";
        string UINAME = "Reflectivity";    ←—1505
>;

float Specularity
<       string UIType = "FLOATSLIDER";
        string name = "0.23";              ←—1506
        string UINAME = "Specular Variance";
>;

texture SurfaceMap
<       string UIType = "SELECTBOX";
        string name = "softsand.dds";      ←—1507
        string UIName = "Texture";
>;

bool RenderQuality
<       string UIType = "HIGHLOW";
        string name = "1";                 ←—1508
        string UINAME = "Quality";
>;

float4 GenerateTexture(float3 Pos : POSITION) : COLOR { float 4 noise = (float4)0;
        Noise.rgb = float3(1 - SCATTER * abs(noise(Pos * 500)),
        SCATTER * noise((Pos + 1) * 500), SCATTER * noise((Pos + 2)
        * 500;
        Noise.rgb = normalise(Noise.rgb);
                .
                .                             1506
                .
}                                                      1001
```

Figure 15

```
                            GlazedPottery2.fx

// Glazed Pottery Shader Version2

// NOTE:
// The glazed surface consists of 2 layers -
// 1. A polished layer of glazing on top (contributes a smooth
// specular reflection and an environment-mapped reflection with
// a freznel term) and
// 2. a coloured ceramic layer with a fractal texture underneath // Parameters float3      gCol;

float       Rf2_ReflectPS;

float       SPC_Variation int         TX_Select;

bool        rQuality;

float4 GenerateTexture(float3 Pos : POSITION) : COLOR { float 4 noise = (float4)0;
    Noise.rgb = float3(1 - SCATTER * abs(noise(Pos * 500)),
    SCATTER * noise((Pos + 1) * 500), SCATTER * noise((Pos + 2)
*500;
    Noise.rgb = normalise(Noise.rgb);
        .
        .
        .
}
```

*Figure 18*

DYNAMIC PARAMETER INTERFACE

CROSS-REFERENCE TO RELATED APPLICATIONS

This application claims benefit of U.S. provisional patent application Ser. No. 60/489,326, filed Jul. 22, 2003, which is herein incorporated by reference.

BACKGROUND OF THE INVENTION

1. Field of the Invention

The present invention relates to dynamically modifying parameters. In particular, it relates to creating a user interface for modifying parameters in response to preferred interface requirements.

2. Description of the Related Art

The provision of increasingly customisable user interfaces is a usual consequence of good design in software engineering. However, not all types of software engineering lend themselves to easy provision of a user interface. Signal processing, in particular, has a set of characteristics that often conflict with the requirements for creating a user interface design. In such circumstances, the job of providing a user interface is considered separately from the job of creating a particular algorithm. As algorithm programming methods improve, the burden of having to provide a suitable user interface for an algorithm becomes a disproportionate large part of the programming effort.

In the computer-aided design, virtual reality and computer game development, signal processing techniques in both the hardware and software undergo rapid improvements in their sophistication. Provision of a dedicated surface shading language, HLSL, has further increased the speed at which it is possible to develop, improve and evolve new types of rendering algorithms for virtual objects and environments.

It is known to provide user interfaces by programming in a high level language such as Java or C++, and speeding up interface development can be achieved by the use of visual "drag and drop" interface development kits. Nevertheless, even with such tools, good user interface design requires time and effort, which could otherwise be advantageously used to create algorithm code for improved shading effects written in the HLSL language.

SUMMARY OF THE INVENTION

According to a first aspect of the invention a method for dynamically provisioning a user interface for a shader is provided. Signals received from a user input device are interpreted to select shader. Source code including program instructions for the shader is parsed to identify user-controllable parameters and preferred user interface components that are then displayed within a user interface. Additional user input signals are obtained based on user interactions with the user interface components and the shader is executed to display the effect of the user interactions. The user interface is dynamically configured and various user interface components may be specified for each shader, reducing the need for creating a dedicated user interface for each shader.

One embodiment of a system and method for dynamically configuring a user interface for a shader includes identifying a shader source file including shader instructions corresponding to the shader, parsing the shader source file to determine an annotation for a parameter, the annotation specifying a preferred parameter interface component object for the shader, and displaying the preferred parameter interface component object in a parameter window within the user interface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 15 details source code for the shader shown in FIG. 12, according to one embodiment of the present invention;

FIG. 18 details source code for the shader shown in FIG. 17, according to one embodiment of the present invention.

DETAILED DESCRIPTION

Figure 1:
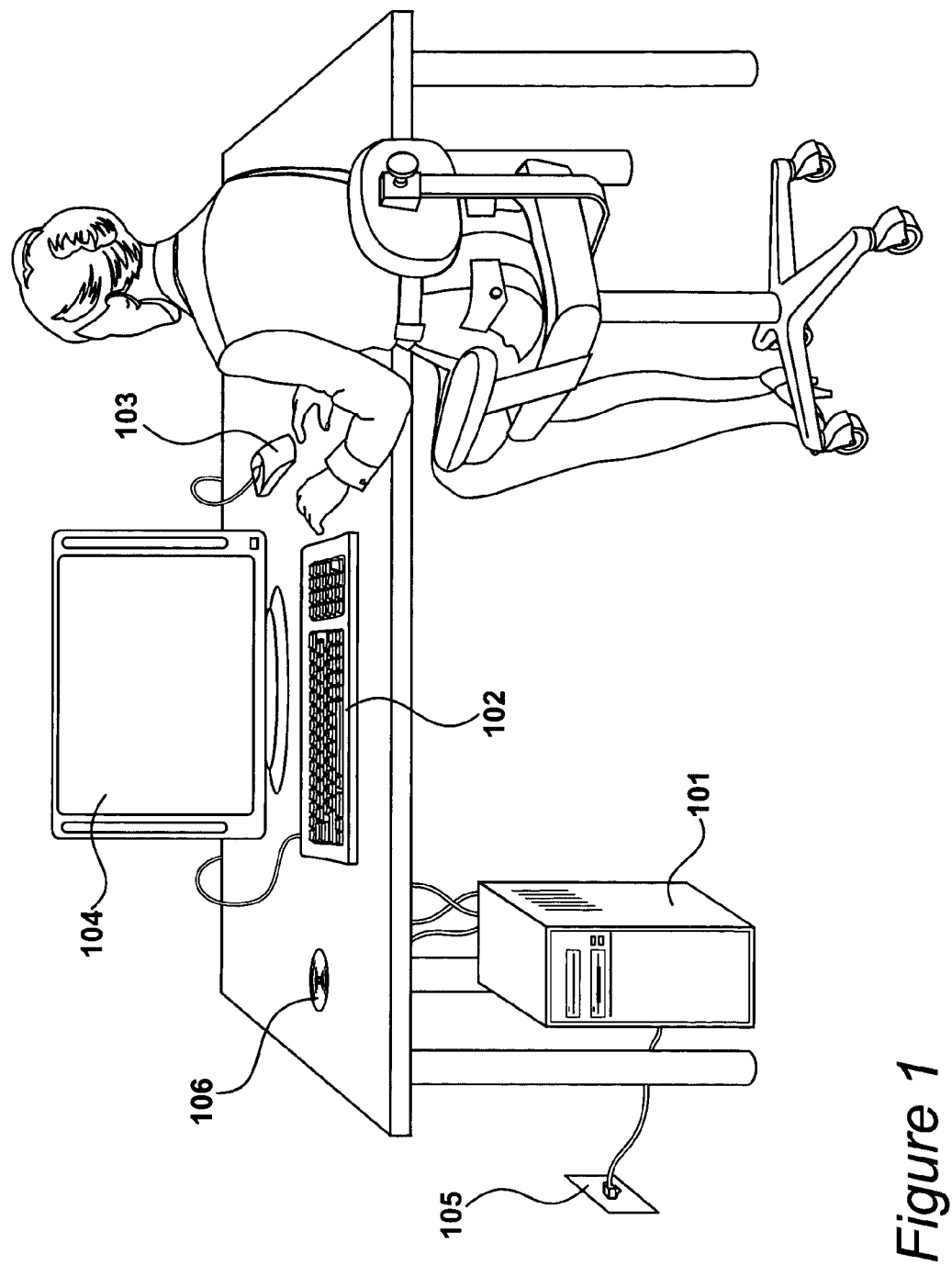
FIG. 1 shows a graphical workstation, including a processing system, a monitor, a CDROM and a network connection, according to one embodiment of the present invention.

FIG. 1 shows a graphical workstation at which graphical design and rendering processes are performed, according to one embodiment of the present invention. A processing system 101 receives user input signals from a keyboard 102 and from a mouse 103 or other pointing device. Results of processing and user interfaces are displayed on a monitor 104, thereby providing fully interactive graphical processing. A network connection supplies signals to and from the processing system 101 over a network 105, over which instructions and data for the processing system 101 may be transferred. The processing system 101 has a CDROM/DVD drive, and a CDROM 106 provides instructions for performing design operations using the processing system 101.

Figure 2:
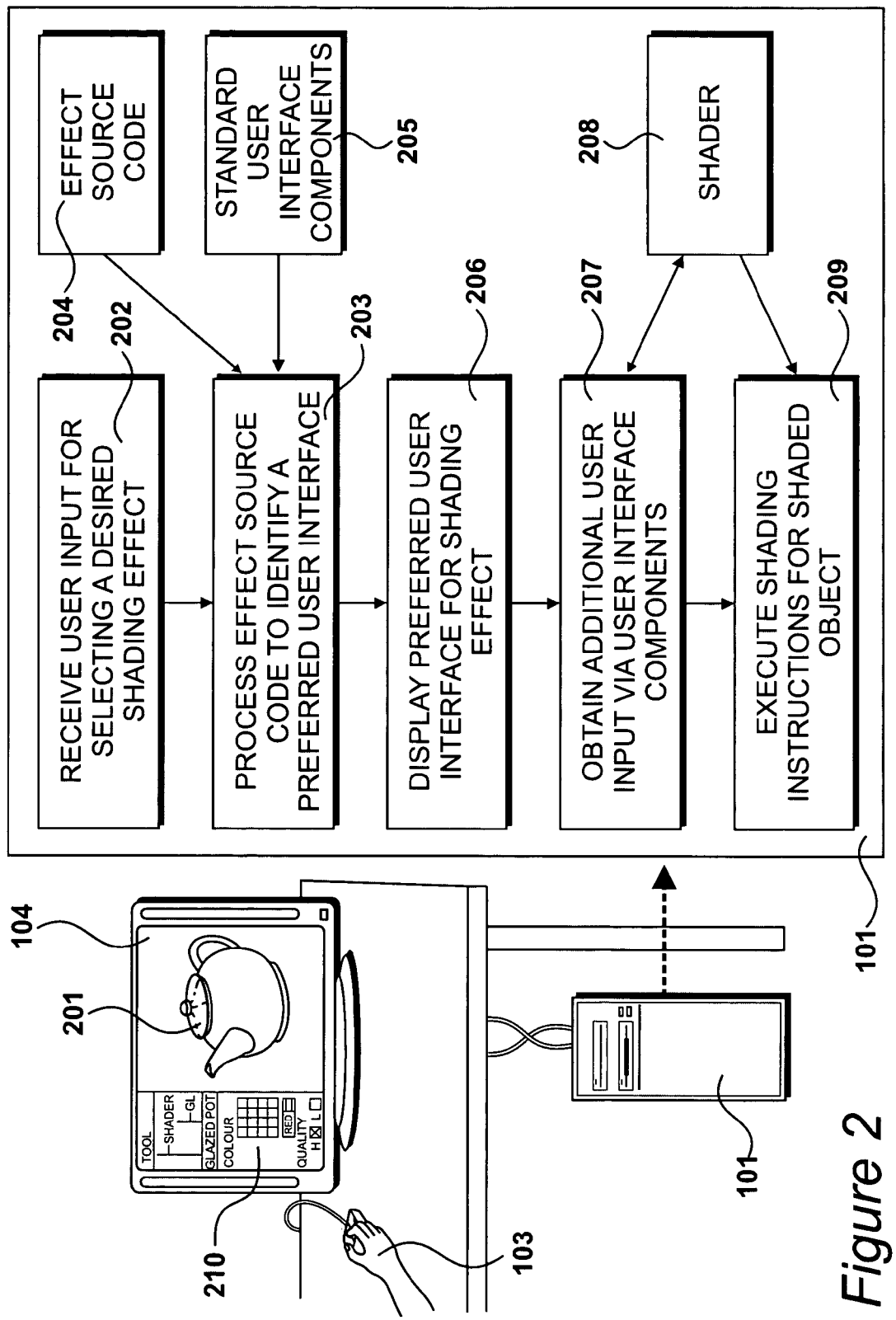
FIG. 2 summarises the invention, including processing steps carried out by the processing system shown in FIG. 1, according to one embodiment of the present invention.

FIG. 2 shows one embodiment of the present invention. A user interface for a design application is displayed on the monitor 104. User input signals are supplied from the mouse 103 to the processing system 101 in response to user operations for the design of a virtual object 201. The virtual object 201 has a surface that requires shading, and many different types of shading are possible. Shading is achieved by processing shading instructions, and it is known that shading effects undergo a significant degree of evolution, due to the high rate of technological development in this field.

Evolution and improvement in shading instructions results in considerable diversity in the types of control parameters that are used to define various aspects of a surface shading process. Provision of a graphical user interface for shading instructions is a time-consuming task that consumes development time to a disproportionate degree. As the design cycle of shading effects continues to accelerate, difficulty in providing suitable user interfaces for large numbers of shaders becomes an increasingly significant overhead in terms of development costs. Furthermore, the utility of a set of shading instructions with a poorly design user interface is significantly reduced.

Steps performed by the processing system 101 provide a comprehensive user interface for different shading effects. At step 202 the processing system receives a user input for selecting a desired shading effect. Typically hundreds of shading effects will be provided, each having a different set of shading parameters. At step 203 the source code 204 for the selected shading effect is parsed to identify a preferred user interface. The preferred user interface is constructed from a wide variety of individual user interface components 205 that are applied in different combinations to provide the preferred interfaces for many different shading effects.

At step 206 the preferred user interface for the shading effect is displayed on the monitor 104. At step 207 the user interacts with the user interface provided for the currently selected shading effect, updating shading effect data 208. At step 209 the shading instructions are executed, resulting in shading of the object 201. In practice, steps 207 and 209 are executed several times in swift succession as the user experiments with different parameter values.

Figure 3:
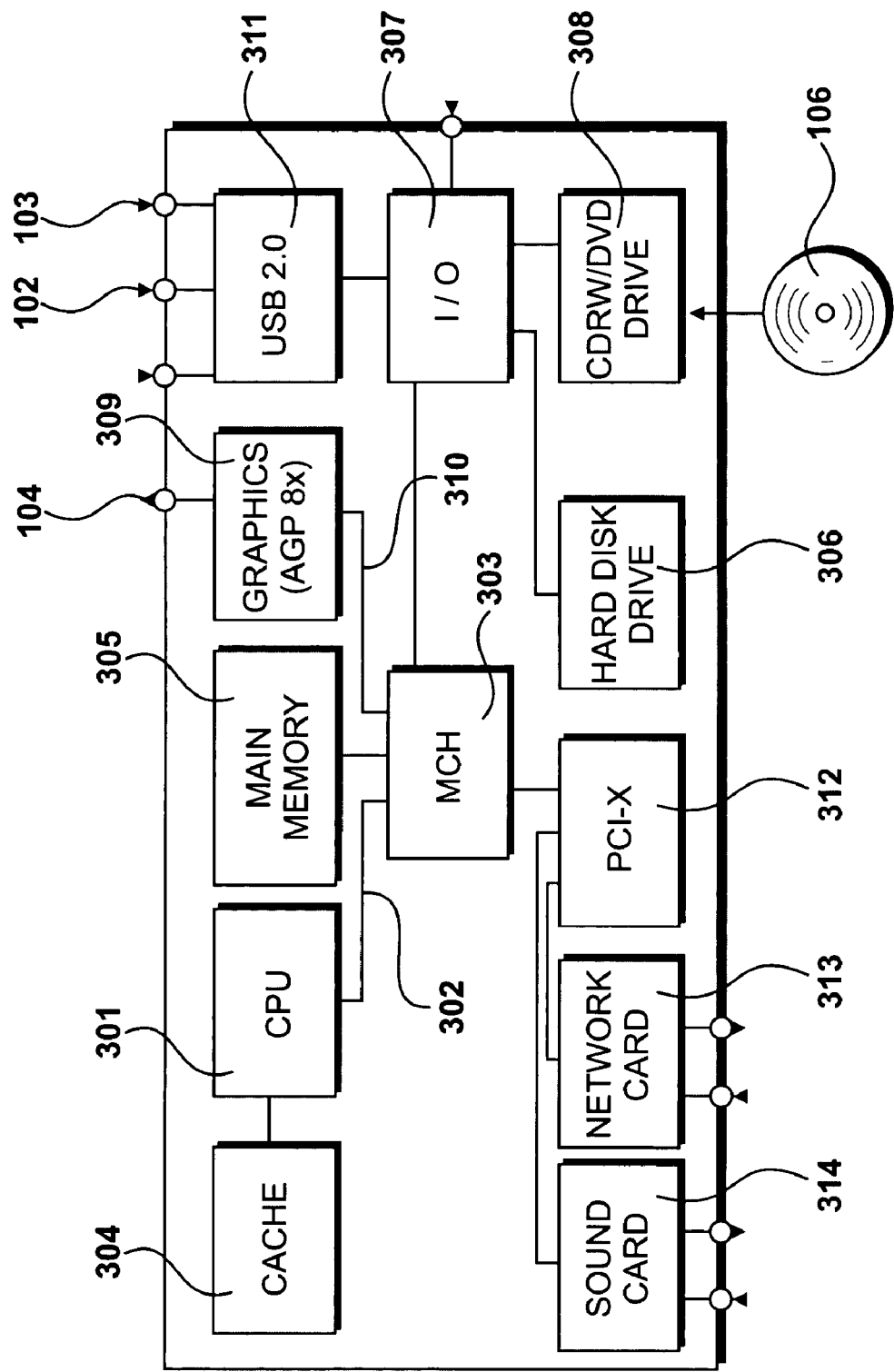
FIG. 3 details the processing system shown in FIG. 1, including a hard disk drive and a main memory, according to one embodiment of the present invention.

FIG. 3 shows the components of the processing system 101, according to one embodiment of the present invention. In some embodiments of the present invention, said components are based upon Intel® E7505 hub-based Chipset.

The system includes an Intel® Pentium™ Xeon™ DP central processing unit (CPU) 301 running at three Gigahertz, which fetches instructions for execution and manipulates data via an Intel® E7505 533 Megahertz system bus 302 providing connectivity with a Memory Controller Hub (MCH) 303. The CPU 301 has a secondary cache 304 comprising five hundred and twelve kilobytes of high speed static RAM, for storing frequently-accessed instructions and data to reduce fetching operations from a larger main memory 305 via the memory controller hub 303. The memory controller hub 303 thus co-ordinates data and instruction flow with the main memory 305, which is one gigabyte in storage capacity. Instructions and data are thus stored in the main memory 305 and the cache 304 for swift access by the CPU 301. A hard disk drive 306 provides non-volatile bulk storage of instructions and data via an Input/Output Controller Hub (ICH) 307. The I/O controller hub 307 similarly provides connectivity to DVD-ROM re-writer 308 which read the CDROM 106 shown in FIG. 1. Connectivity is also provided to USB 2.0 interface 311, to which the keyboard 102 and mouse 103 are attached, all of which send user input data to the processing system 101.

In one embodiment of the invention, a computer readable medium stores instructions for causing a computer to dynamically configure a user interface for a shader by performing the steps of identifying a shader source file including shader instructions representing the shader, parsing the shader source file to determine an annotation for a parameter, the annotation displaying a preferred parameter interface component object for the shader, and displaying the preferred parameter interface component object in a parameter window within the user interface.

A graphics card 309 receives graphic data and instructions from the CPU 301. The graphics card 309 is connected to the memory controller hub 303 by means of a high speed AGP graphics bus 310. A PCI interface 312 provides connections to a network card 313 that provides access to the network 105, over which instructions and or data may be transferred. A sound card 314 is also connected to the PCI interface 312 and receives sound data or instructions from the CPU 301.

The equipment shown in FIG. 3 constitutes the components of a high-end IBM™ PC compatible processing system. In an alternative embodiment of the present invention, similar functionality is achieved using an Apple™ PowerPC™ architecture-based processing system.

Figure 4:
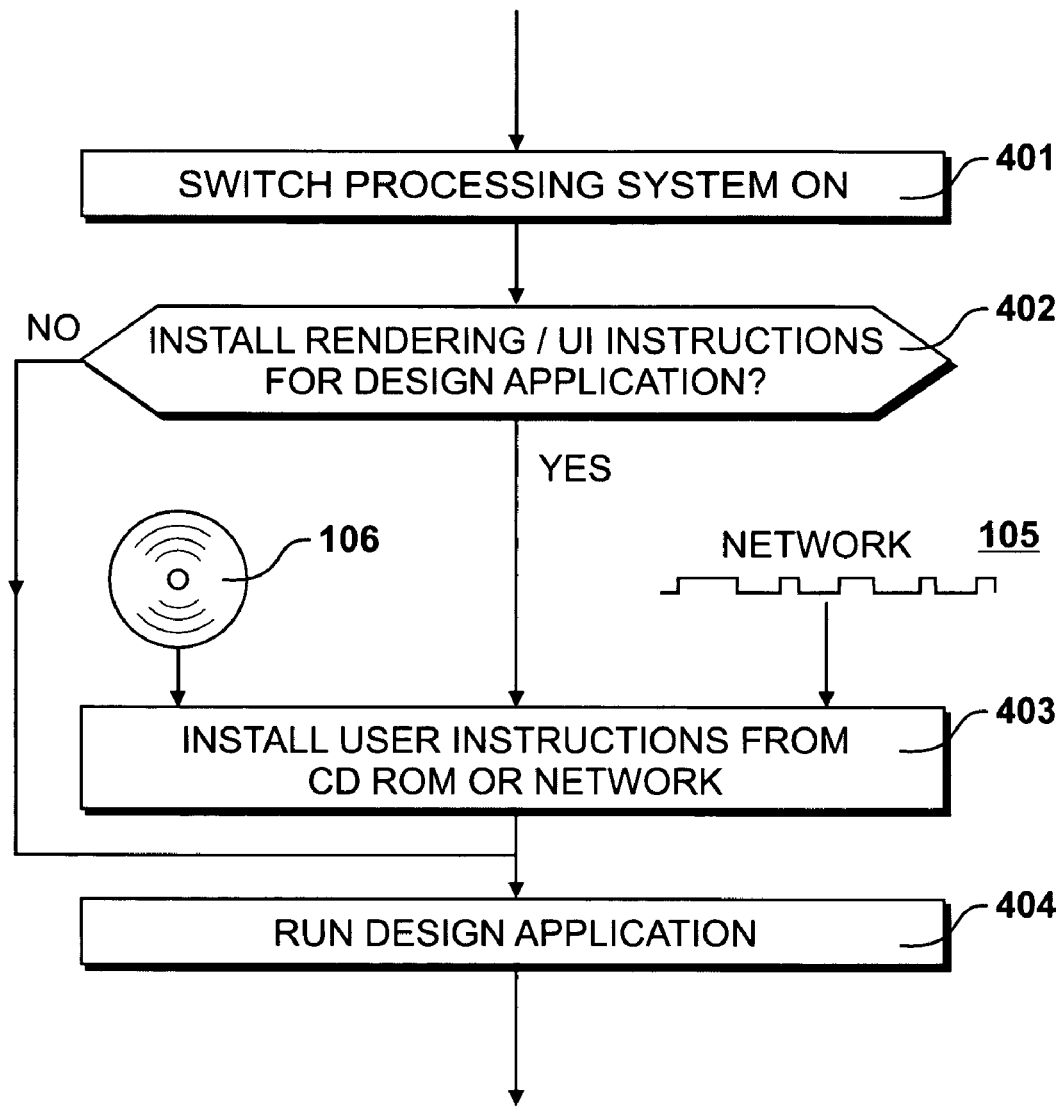
FIG. 4 details installation of design instructions onto the hard disk drive shown in FIG. 3 via the network or CDROM shown in FIG. 1, according to one embodiment of the present invention.

FIG. 4 shows a summary of operations performed by the user on the processing system 101, according to one embodiment of the present invention. At step 401 the user switches the processing system 101 on. The processing system is used to perform design operations for virtual objects, such as objects that may be used in computer games, virtual reality or computer-aided design. In order to do this, the processing system 101 is loaded with appropriate instructions for creating, editing and rendering virtual objects. At step 402 a question is asked as to whether such instructions need to be installed. If not, control is directed to step 404. Alternatively, at step 403, design instructions are installed onto the processing system either from the network 105 or the CDROM disc 106. At step 404 the design instructions are executed, thereby enabling the user to create, edit and render objects as required.

Figure 5:
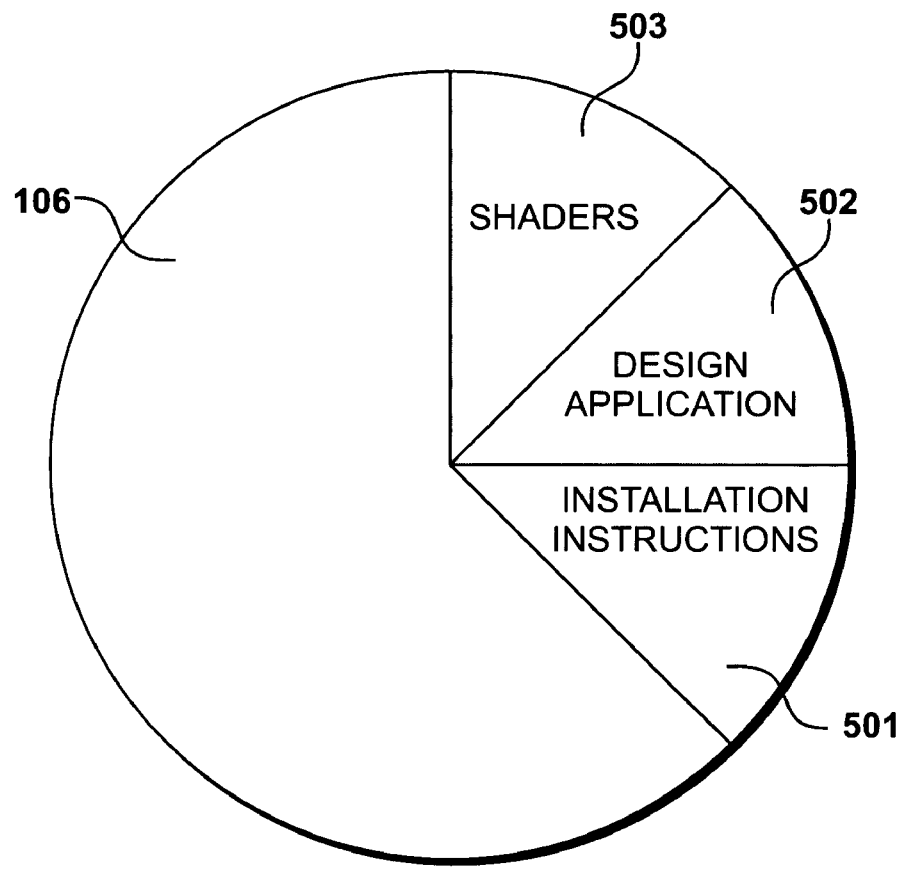
FIG. 5 details the contents of the CDROM shown in FIG. 1, according to one embodiment of the present invention.
Figure 6:
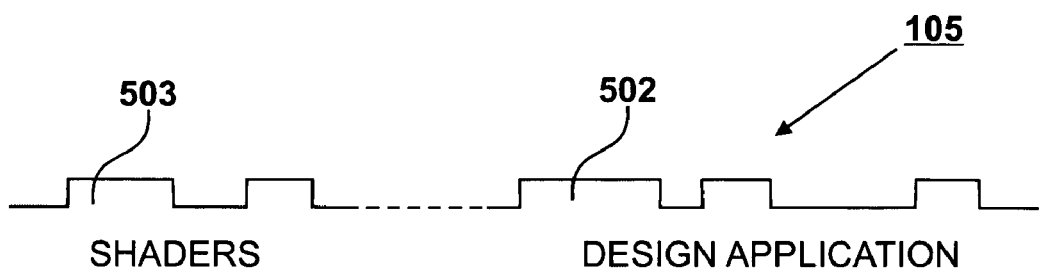
FIG. 6 illustrates transmission of design instructions via the network shown in FIG. 1, according to one embodiment of the present invention.

FIG. 5 shows contents of the CDROM 106 shown in FIGS. 1 and 2, according to one embodiment of the present invention. The arrangement of data is intended to be symbolic and not representative of the physical storage configuration on the disk itself. Installation instructions 501 are provided to decompress, format and disperse design application instructions 502 onto the hard disk drive 306. The design application 502 may also include data, such as clipart, textures and fonts. Shading effect instructions 503 are preferably also supplied on the CDROM 106. Up to several hundred shaders may be supplied. Due to the rapid development and evolution of shading effects, shaders are often downloaded over a network 105. Shading instructions are often supplied as executables along with their source code, enabling further customisation and modification of a particular shading effect to take place. Design application instructions 502 and shaders 503 may also be installed over the network 105, according to one embodiment of the present invention, as shown in FIG. 6. When this is done, the instructions and data are encoded as a serial stream of electrical impulses, that are decoded, error corrected, decompressed and installed according to protocols well known in the art.

Figure 7:
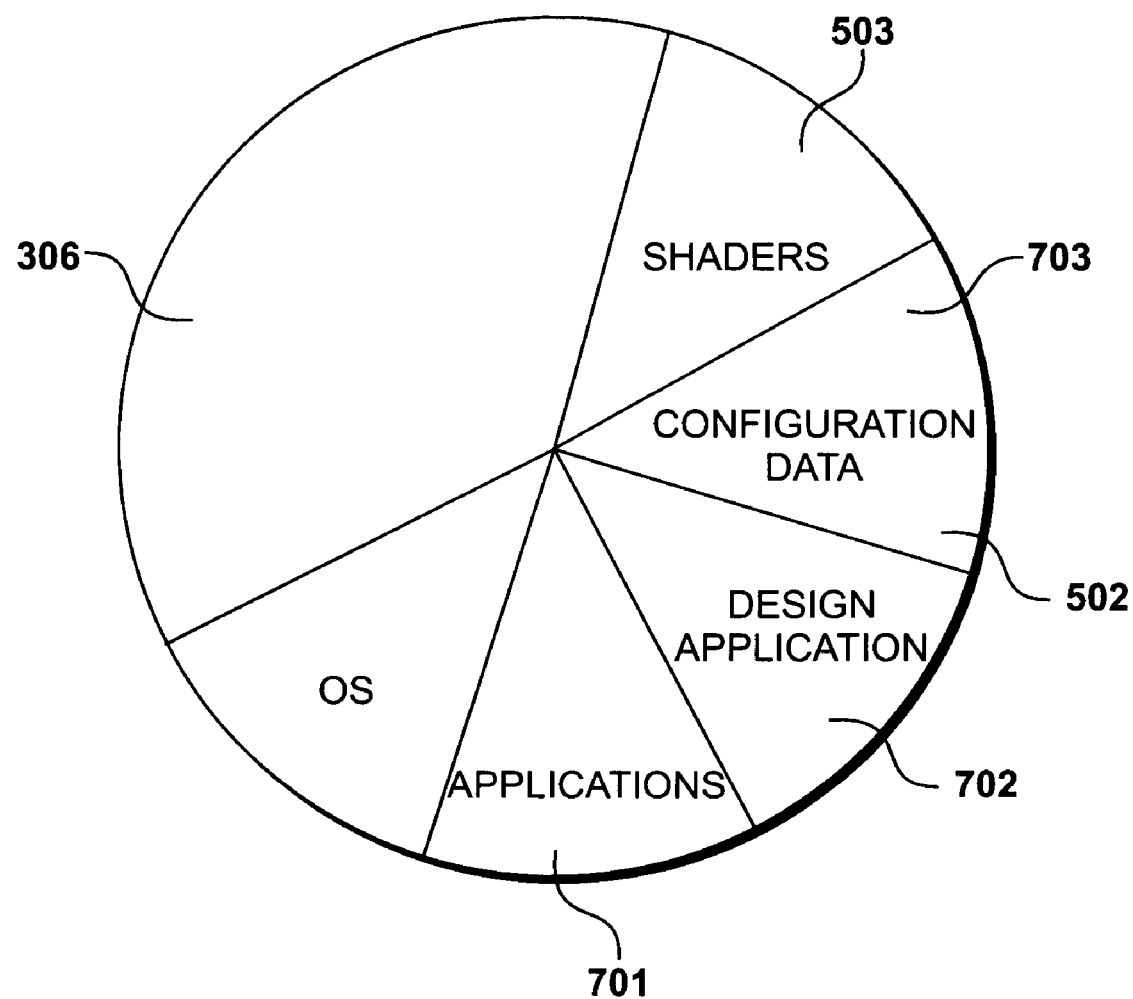
FIG. 7 shows the pattern of information on the hard disk drive shown in FIG. 3 as a result of the installation steps carried out in FIG. 4, according to one embodiment of the present invention.

After installation 403 has taken place, the contents of the hard disk drive 306 are updated to provide non-volatile storage of the new instructions and data. FIG. 7 shows relevant data structures, according to one embodiment of the present invention. A Windows™ XP™ operating system 701 provides common functionality and device abstraction layers for various applications 702 running on the processing system 101. The design application 502 is located on the hard disc 306 in uncompressed form. Configuration data for the particular processing system 101 is stored at 703, providing the user with various options that are unique to his or her working style. Shaders 503 are also stored in their uncompressed form, both as executable files and as source code files.

Figure 8:
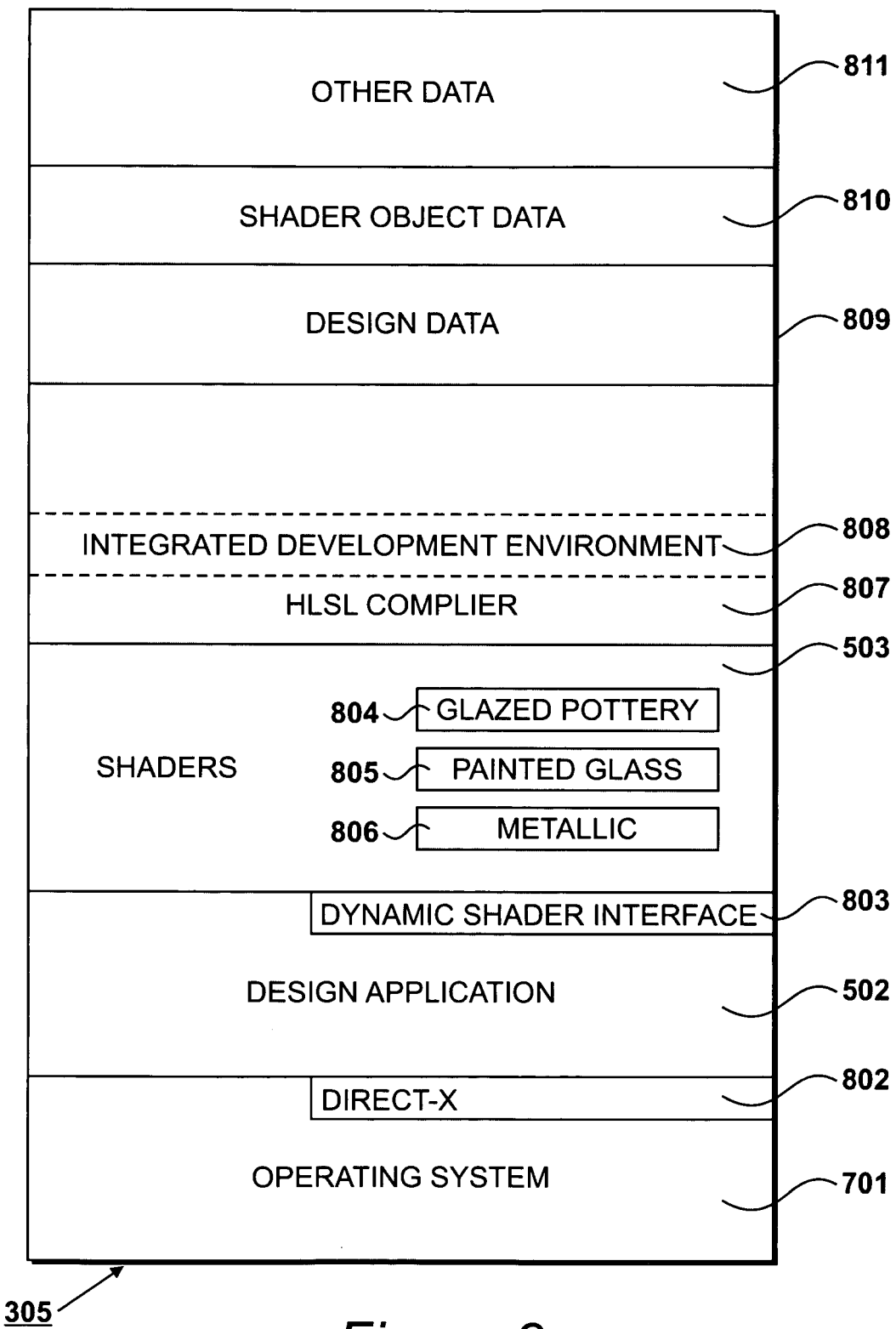
FIG. 8 details contents of main memory while running the design application, according to one embodiment of the present invention.

When the user starts execution of the design application instructions 502 at step 404, the contents of the main memory 305 are as shown in FIG. 8, according to one embodiment of the present invention. The operating system 701 includes specialised instructions for image and sound rendering operations, known as Direct-X™ 802. The design application 502 includes instructions 803 for dynamically creating a user interface for a shading effect. The shading effects 503 include a Glazed Pottery effect 804, a Painted Glass effect 805 and a metallic effect 806. Optionally the processing system 101 may be used by someone who wishes to modify or experiment with shading effect source code, and to use the design application 502 as a test-bed for these operations. In this case, the main memory will include HLSL compiler instructions 807 and an integrated development environment (IDE) 808 for the swift modification, compilation and debugging of effects source code. The shading effects 503 are written in HLSL (High Level Shading Language) that provides efficient commands for common operations used in shading and other rendering algorithms. The HLSL source code is converted into an executable shading effect by the HLSL compiler instructions 807.

When objects are created in the design application 502, virtual object data is created. Other types of data may also be created, such as textures, colours and any other information related to objects and their environments. This data is stored as design data 809. When a shader is used by the design application 502, a shader object is instantiated, as represented by shader object data 810. Other data, for example dynamic configuration and view data is also stored in the main memory at 811.

Figure 9:
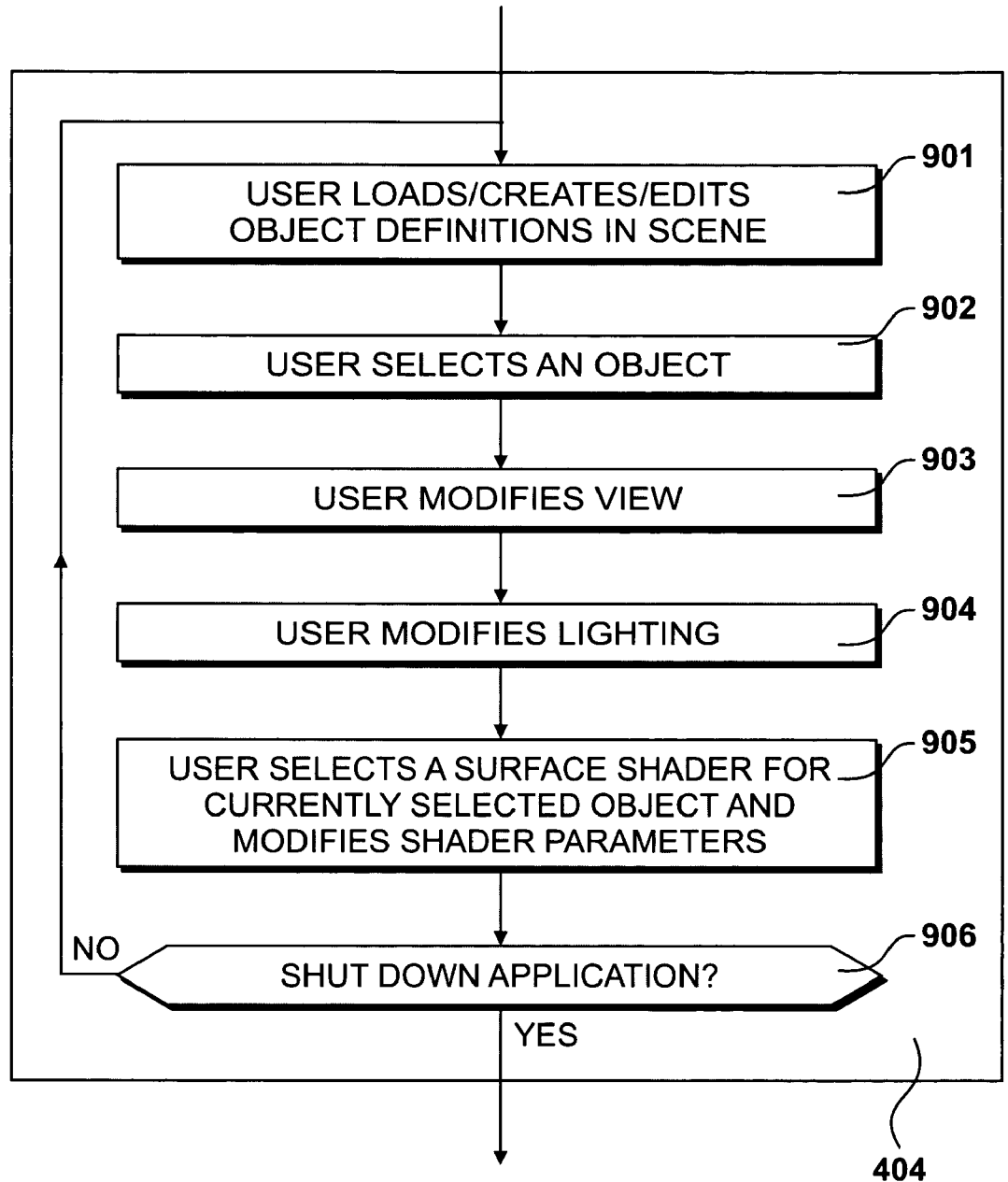
FIG. 9 details actions performed by the processing system shown in FIG. 1 while running the design application, including a step of selecting a shader and modifying its parameters, according to one embodiment of the present invention.

FIG. 9 shows the step 404 of running the design application shown in FIG. 4, according to one embodiment of the present invention. At step 901 the user loads, creates or edits object definitions in a virtual scene. At step 902 the user selects an object, such as the teapot 201. At step 903, the user modifies the view of the object 201, in order to best view its surface characteristics. The object is illuminated, by one or several virtual light objects. Reflections, coloring and surface textures may all be visualised using the design application 502. At step 904 the user modifies the lighting of the object 201. This may include changing the color of a virtual light and or its position relative to the object 201 being lit. At step 905, the user selects a surface shader for the currently selected object and modifies shaders parameters. At step 906, a question is asked as to whether editing is complete. If not, control is directed back to step 901. Alternatively, this completes the use of the design application 502. Steps 901 to 906 may be executed in a different order, or may even be performed to some degree concurrently. The order of these steps is intended as an example only.

Figure 10:
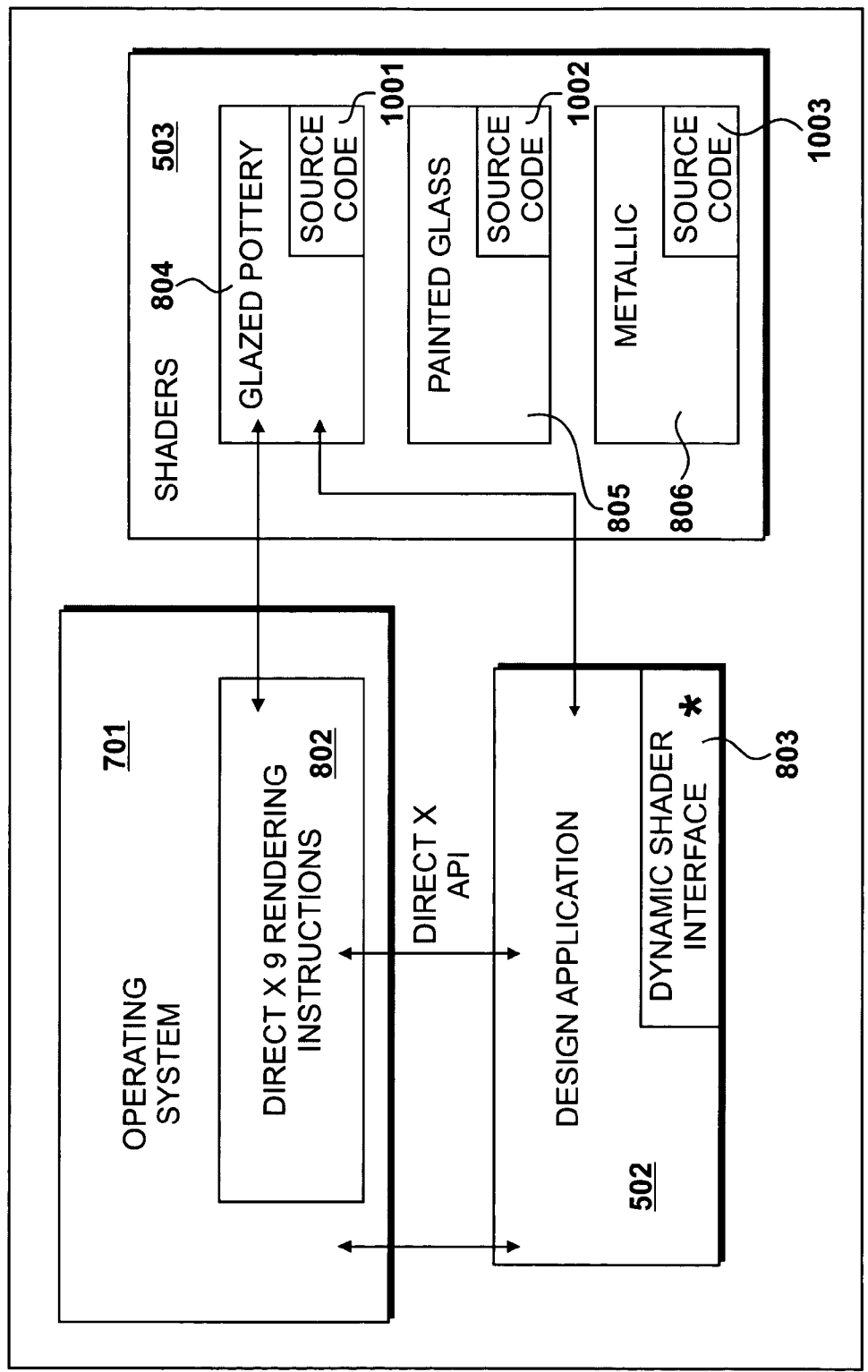
FIG. 10 details relationships that exist between elements of the main memory detailed in FIG. 8, including shader source code, according to one embodiment of the present invention.

FIG. 10 shows relationships between the various components of the main memory 305 when running the design application, according to one embodiment of the present invention. The design application 502 interacts with the operating system 701 and with rendering instructions 802 via the DirectX™ Application Programming Interface (API). The operating system 701 performs such actions as opening files and task switching between concurrent applications. The rendering instructions 802 provide efficient means for performing graphics processing, including drawing primitive shapes, three dimensional geometrical transformations, texture mapping and frame buffering.

The design application also communicates with the currently selected shader 804. The shaders 804, 805 and 806 also include associated source code 1001, 1002 and 1003, that is used by the dynamic shader interface instructions 803. Source code 1001, 1002 or 1003 is not used by the rendering instructions 802 or the operating system 701. Effect source code 1001 for the currently selected shader 804 is examined by the dynamic shader interface instructions 803 in order to construct a preferred interface for the shader, by which the user can navigate and select several shader-specific options and parameters.

Figure 11:
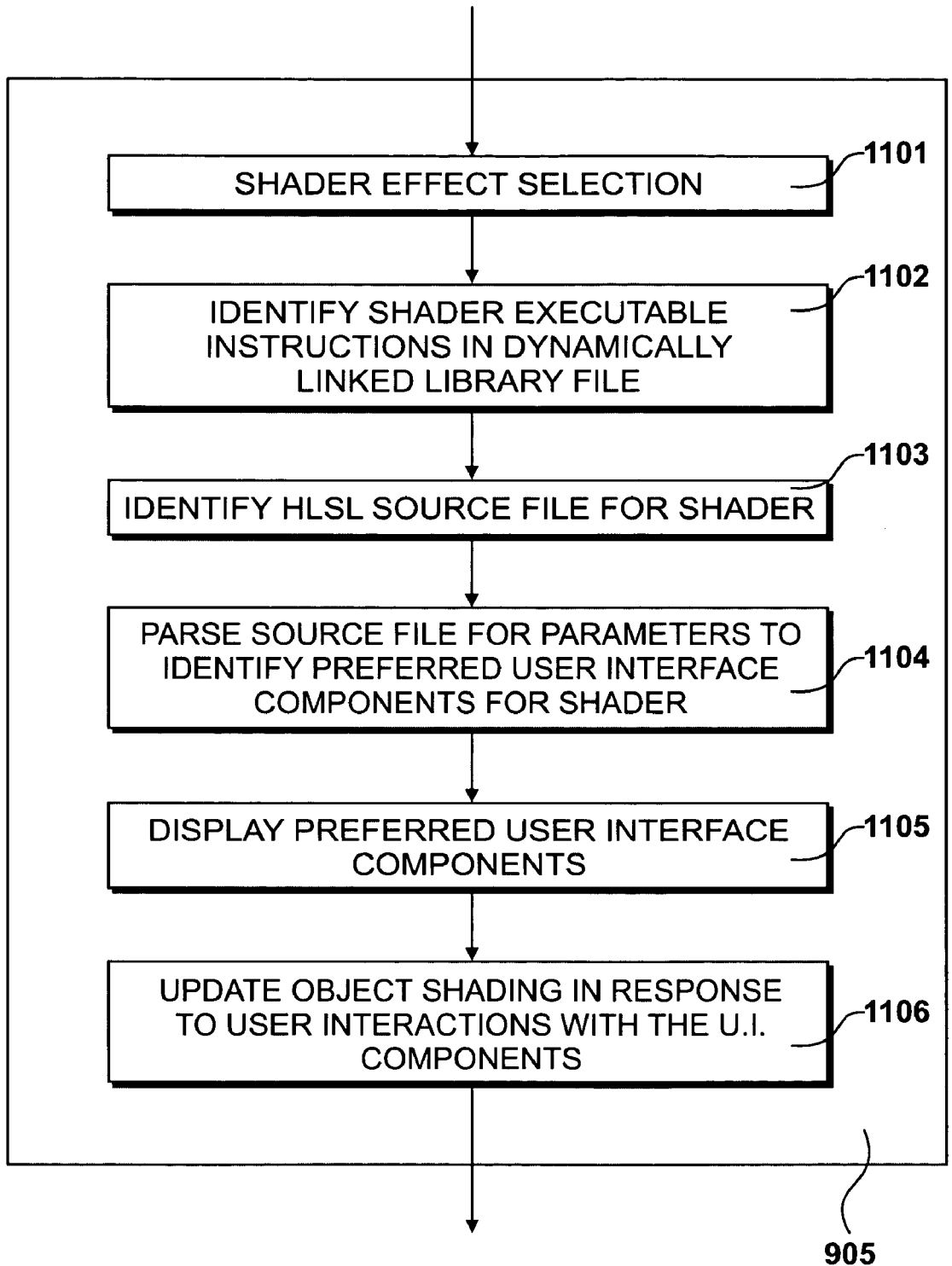
FIG. 11 details the step of selecting a shader and modifying its parameters shown in FIG. 9, including a step of parsing a source file, according to one embodiment of the present invention.

FIG. 11 shows the step 905 of selecting a shader and modifying shader parameters, shown in FIG. 9, according to one embodiment of the present invention. At step 1101 shader effect selection is performed. In this process, the user is provided with a selection dialogue from which one of the many shaders available is selected. At step 1102 executable instructions for the shader are identified. These executable instructions are contained within a dynamically linkable library file, having the suffix ".dll". At step 1103 associated source code for the shader is identified. This is in an ASCII format file having the suffix ".fx".

At step 1104 the dynamic shader interface instructions 803 parse the shader source file 1001 to identify preferred user interface components for the shader parameters. In a first embodiment of the present invention, parameter annotations contain references to pre-existing standard interface components, such as a color browser interface component, that, when assembled together, provide a unique user interface for the shader.

The need for such an approach exists because modification of shader source code to improve or extend shader functionality is a relatively dedicated process. However, provision of a user interface is an additional time-consuming use of human resources, largely separate from the problem of implementing and improving a shading algorithm. Shading effects are sufficiently valuable to have their own high level language, HLSL (High Level Shading Language), that can be used by a software engineer to write shaders and other rendering algorithms more easily than when assembly language or C++ is used. However, the burden of having to specify, design and implement a user interface becomes increasingly significant as the efficiency and speed with which shader algorithms can be created increases. In the invention, the need for a suitable interface is met by generating the interface automatically. The sharing of source code within and between organisations accelerates the design of new shading effects. By removing the need to create or redesign a complex user interface each time a shader is created or improved, the need for a highly effective user interface is met without interfering with the rate of development of shading effect functionality.

Figure 12:
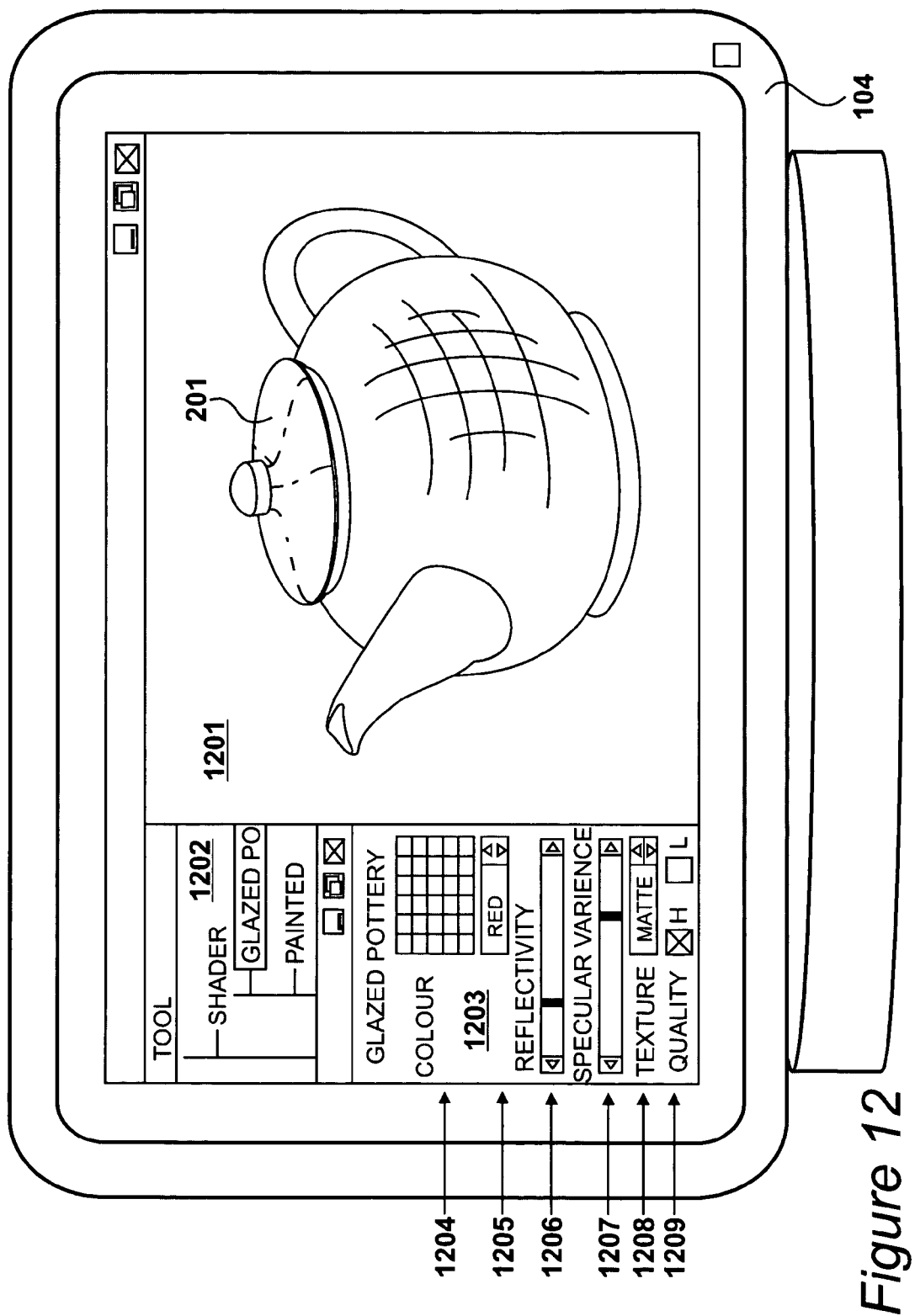
FIG. 12 shows a screenshot of the monitor shown in FIG. 1 while modifying a parameter for a first shader, according to one embodiment of the present invention.

FIG. 12 shows the interface for the design application 502 shown on the monitor 104, according to one embodiment of the present invention. A view window 1201 displays a view of the scene currently under construction. Objects in the scene, such as object 201, may be viewed as fully or partially rendered. Typically, the user has a choice of several views, and more than one view can be displayed at a time, if preferred. By appropriate operations with the mouse 103, the user may select any particular viewpoint, and zoom in or out to view the object 102 at any desired level of detail or angle.

A tool selection window 1202 includes a menu for selecting a shader for the currently selected object 201. In this case, the "Glazed Pottery" shader 804 has been selected by the user at step 1101. Many shaders are provided for the user to apply to different objects.

A preferred user interface for the shader 804 is displayed in a parameter window 1203. Interface components for the Glazed Pottery shader 804 include: A color browser component 1204, a reflectivity slider component 1206, a specular variance slider component 1207, a texture select box component and a render quality boolean switch component. The color browser 1204 includes a field 1205 in which a named color can be specified, such as "WHITE", "BLACK" or some other named color. The reflectivity interface component 1206 is a slider that smoothly adjusts the amount of reflection from the surface of the shaded object 201. The specular variance interface component 1207 smoothly varies the probability density function of angle of incidence for light ray dispersion. The texture interface component 1208 selects a pre-defined sub-surface texture beneath the glazed layer of the surface. The rendering quality interface component 1209 specifies whether the rendering performed should be of a high or a low precision. High precision rendering can take a considerable amount of time, and for this reason a low quality option is provided for previewing results. The rendering quality is also controllable as a global parameter from outside the parameter interface 1203.

Figure 13:
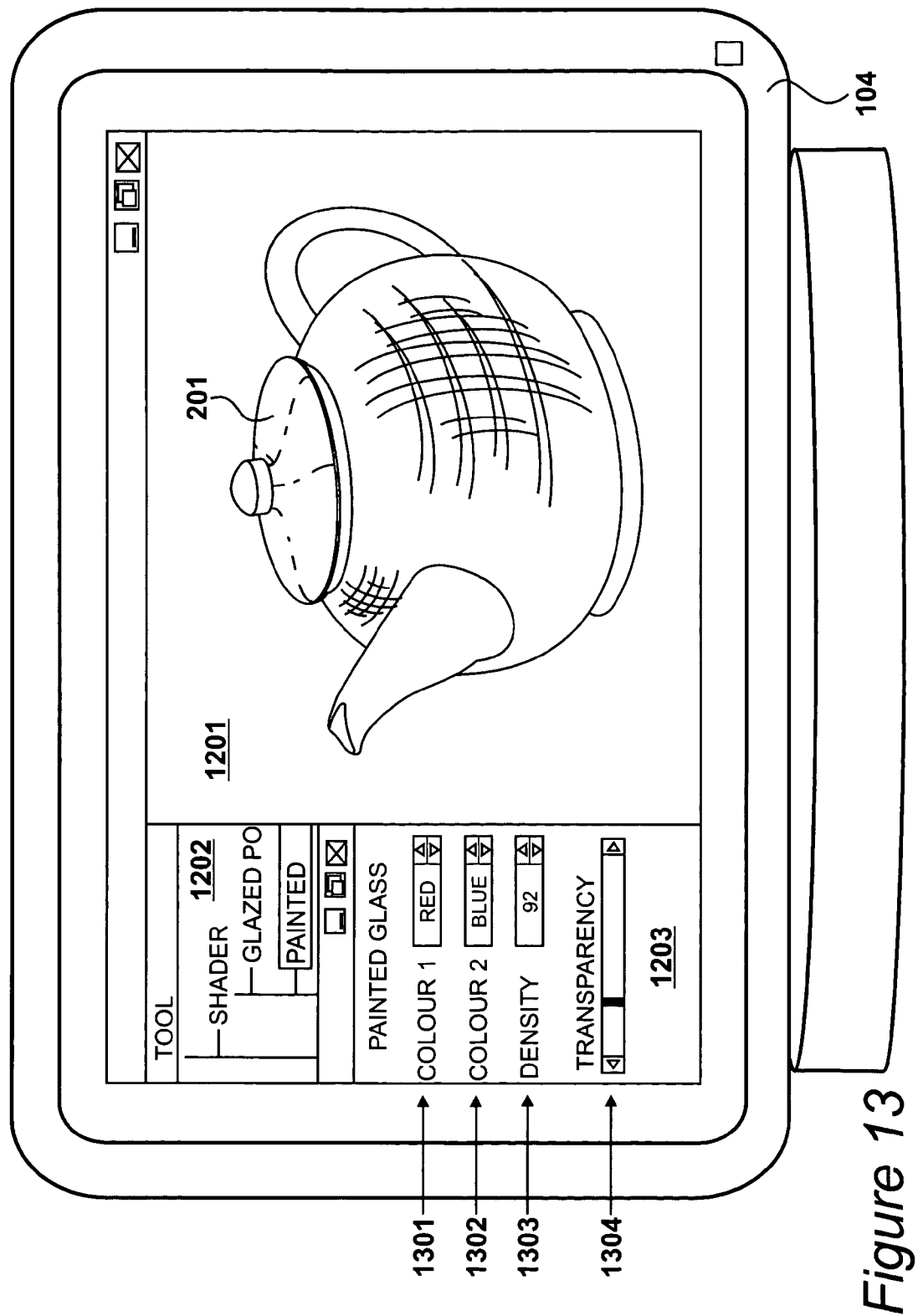
FIG. 13 shows a screenshot of the monitor shown in FIG. 1 while modifying a parameter for a second shader, according to one embodiment of the present invention.

The tool selection window 1202 can be used to select a different shader for the currently selected object 201. FIG. 13 shows the effect of selecting a different shader, according to one embodiment of the present invention. The parameter window 1203 for the shader changes in response to the preferred user interface for the shader, that is identified in response to the processing of the new shader's source code 1002 as performed at step 1104. The preferred interface for the "Painted Glass" shader is shown in the parameter window 1203 shown on the monitor in FIG. 13. This comprises a first color selector interface component 1301, a second color selector interface component 1302, a density value spin-box interface component 1303 and a transparency slider interface component 1304. The layout and selection of these interface components is clearly different from the preferred interface for the "Glazed Pottery" shader illustrated in FIG. 12. The two colors are defined by color selection boxes instead of a color browser, to make the best use of the limited space available. Nevertheless, this interface was not created by explicit programming, but by parameter annotations in the source code 1002 for the shader effect 805, thereby saving the programmer a lot of time when the shader was written.

Figure 14:
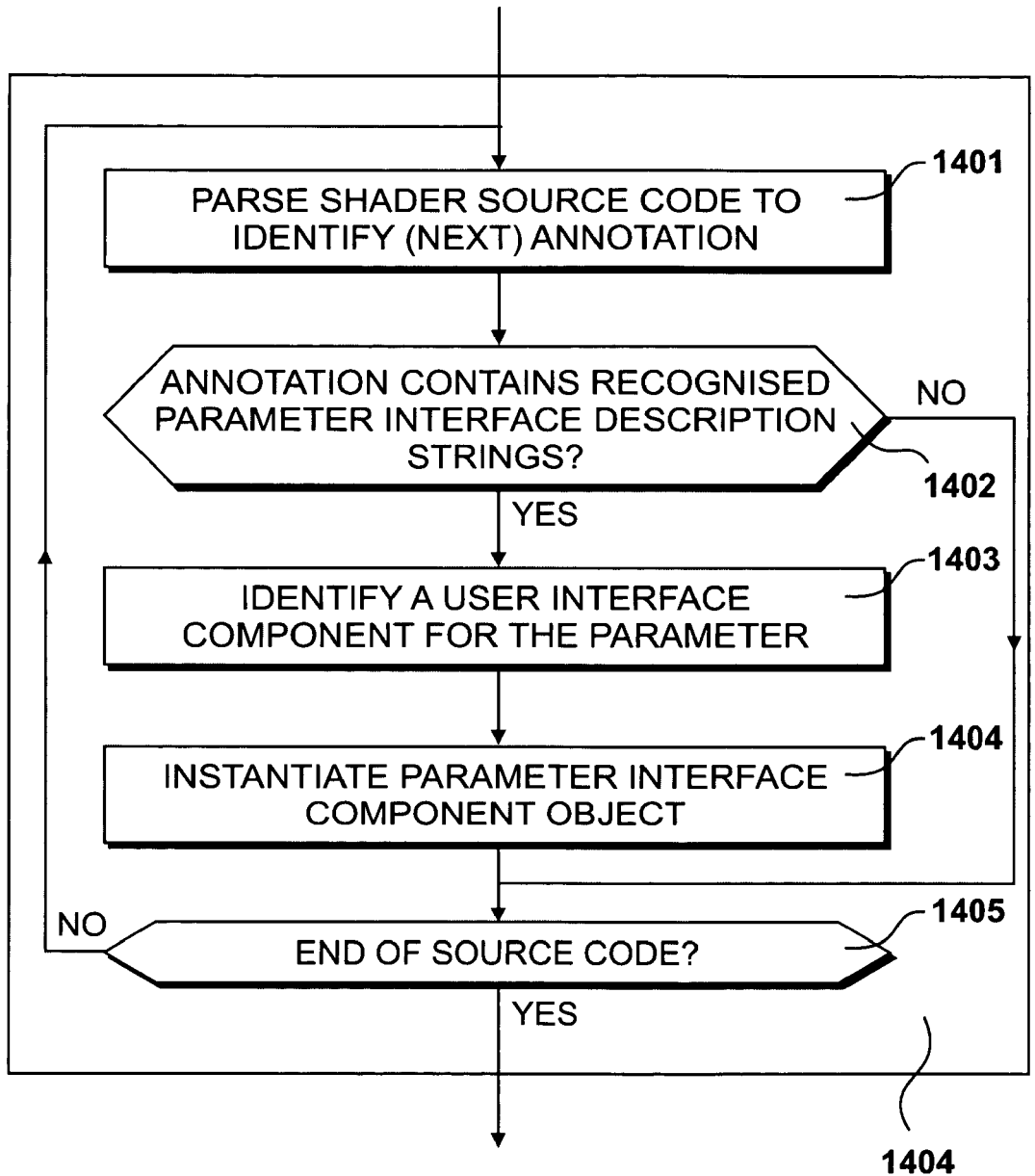
FIG. 14 details the step of parsing a source file shown in FIG. 11.

FIG. 14 shows parsing of the shader source code shown at step 1104 in FIG. 11, according to one embodiment of the present invention. At step 1401 the currently selected shader's source code 1001 is parsed until the first annotation is found. At step 1402 a question is asked as to whether the annotation contains recognised parameter interface description strings. If so, control is directed to step 1403. Alternatively, if the annotation is not recognised, or if no annotations were found, control is directed to step 1405.

At step 1403 a user interface component is identified for the annotated parameter. At step 1404 a parameter interface component object is instantiated for the parameter. At step 1405 a question is asked as to whether all the source code has been examined for annotations. If not, control is directed back to step 1401 so that additional annotations may be identified. Alternatively, if all the source code has been examined, this completes the steps for examining the source code for the shader.

FIG. 15 shows source code 1001 for the "Glazed Pottery" shader, according to one embodiment of the present invention. The name of the source code file is "GlazedPottery.fx", it contains source code written in HLSL (High Level Shading Language). HLSL has two types of comments. A first type of comment is formed by any text following a double forward slash "//" character pair. The second type of comment is the annotation, which is placed after a declaration and comprises all text between the next pair of angle brackets "<..>". The declaration must be finished off with a semicolon ";". Annotations and comments are both ignored by the HLSL compiler that generates executable shader instructions. In the source code sample shown in FIG. 15, a correspondence may be seen between parameter annotations and the appearance of the preferred user interface for the shader parameters shown in FIG. 12. At 1501 the annotated SurfaceColor variable includes an interface component definition 1502, defining the type of color browser shown at 1204 in FIG. 12. A default value for the parameter is provided at 1503, and a displayable description for the parameter is defined at 1504. Similarly, annotated parameters in the source code at 1505, 1506, 1507 and 1508 define user interface components 1206, 1207, 1208 and 1209 that are shown in FIG. 12. At 1506, in FIG. 15, the first part of a function for the shader is shown.

Figure 16:
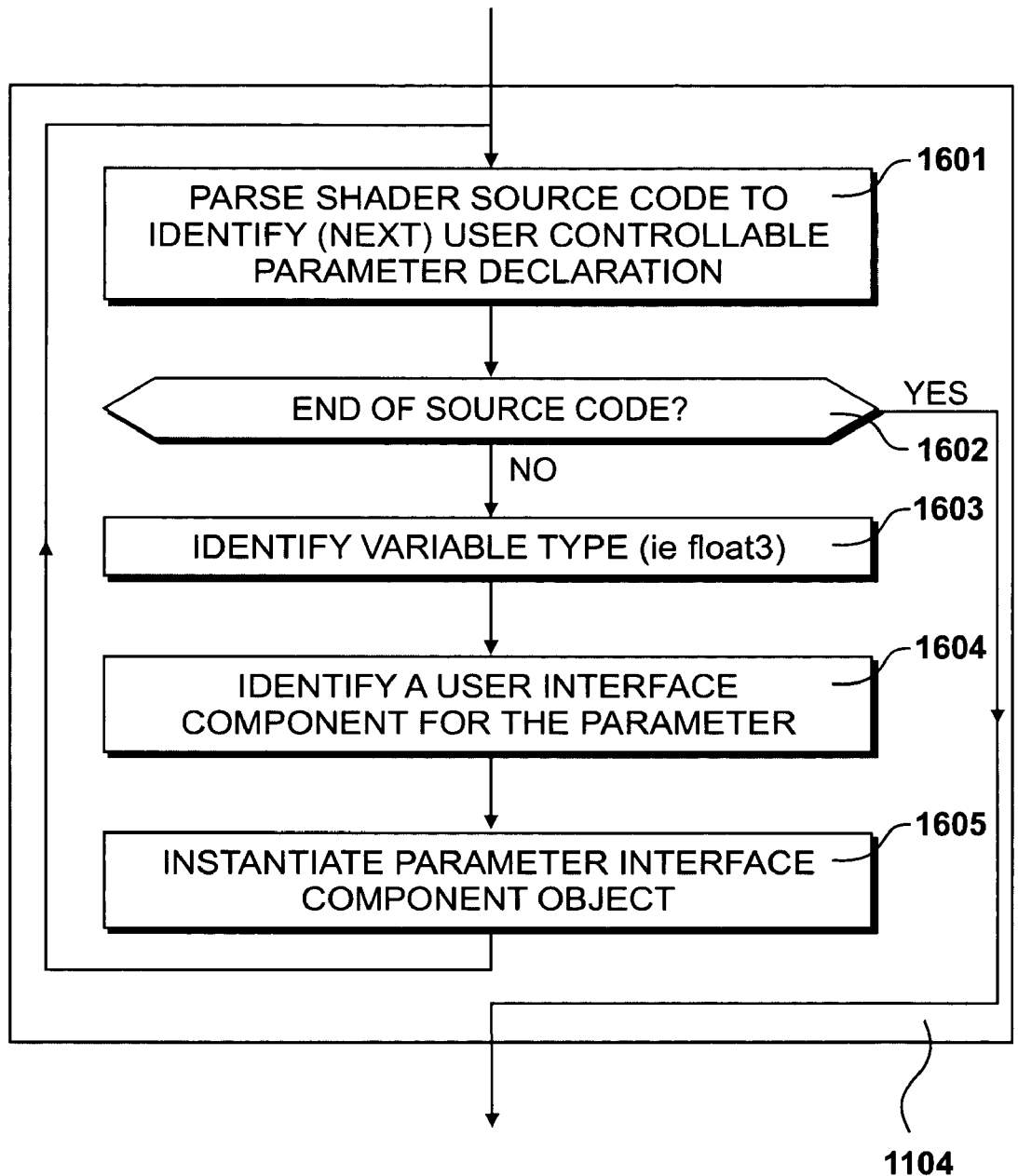
FIG. 16 details the step of parsing a source file shown in FIG. 11 according to a second embodiment, according to one embodiment of the present invention.

In an alternative embodiment of the present invention, annotations describing a preferred user interface are not provided. However, in order to avoid the need to implement a user interface for a shader by writing specific interface code, it is still possible to advantageously generate a user interface automatically. In the alternative embodiment of the present invention, step 1104 shown in FIG. 11 is performed in accordance with the steps shown in FIG. 16.

At step 1601 the shader source code 1001 is parsed to identify the first user-controllable parameter declaration. It is possible to determine whether or not a declared parameter is user-controllable by an examination of its context. At step 1602 a question is asked as to whether the end of the source code has been encountered before a declaration was found. If so, this concludes the steps for interface generation. Alternatively, if a parameter declaration has been found, control is directed to step 1603. At step 1603 the type of the variable used for the parameter is identified. Typical variable types are bool, int, float and float 3. A float 3 type is common, as it is often used to store color values in a single variable. A float 3 variable is often used to store red, green and blue components of a color. However, this cannot be assumed.

At step 1604 a suitable user interface component for the parameter is identified. In the case of a float 3 variable, three continuous sliders are used. Some indication of the parameter's use may be obtained from the variable name, for example, gCol. This will be displayed next to the three sliders. In this way, the most appropriate interface for the parameters is generated, even without annotations being provided. Of course this is clumsy and prone to difficulties, but may be better than having no access at all to the shader's parameters, which would otherwise restrict the user to its default setting. At step 1605 the parameter interface component object is instantiated, and control is directed back to step 1601. These steps are repeated until all user-controllable parameters have been parsed, and interface components identified.

Figure 17:
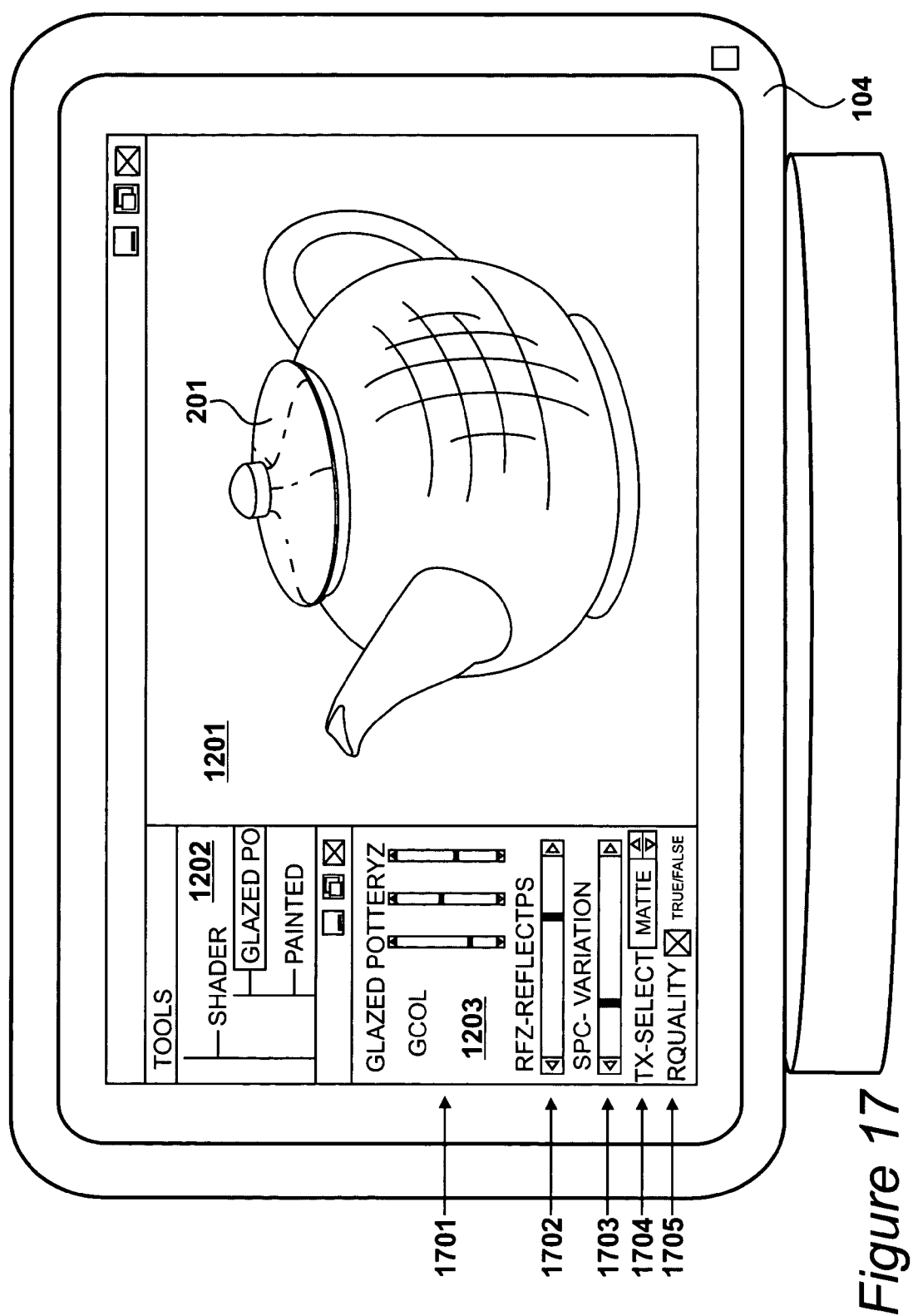
FIG. 17 shows a screenshot of the monitor shown in FIG. 1 while modifying a parameter for a second shader operating according to the second embodiment of the invention, according to one embodiment of the present invention.

The result of generating a user interface, according to one embodiment of the present invention, is shown in FIG. 17. The name of the shading effect is "Glazed Pottery2", an updated version of "Glazed Pottery". Typically a situation of this sort is encountered when developers release a shader before they have had time to annotate its parameters. A preferred interface has been constructed for the shader parameters 1203 at 1701, 1702, 1703, 1704 and 1705. Source code for the shader, according to one embodiment of the present invention is shown in FIG. 18.

The invention has been described above with reference to specific embodiments. Persons skilled in the art will recognize, however, that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

The invention claimed is:

1. A computer readable medium storing instructions for causing a computer to dynamically configure a user interface for a shader by performing the steps of:
identifying shader source code representing the shader that includes shader parameters and annotations associated with the shader parameters, wherein the annotations are ignored by a compiler configured to generate executable code corresponding to the shader source code;
identifying a first annotation associated with a first shader parameter included in the shader source code, wherein the first annotation specifies a color browser, spin box, slider, or selection box parameter interface component object;
determining that the first annotation includes a recognized parameter interface description string;
instantiating a parameter interface component object associated with the recognized parameter interface description string, wherein the parameter interface component object provides an interface through which a user can adjust a value associated with the first shader parameter; and
displaying the parameter interface component object in a parameter window within the user interface.

2. The computer readable medium of claim 1, further comprising the step of receiving an input specifying the shader.

3. The computer readable medium of claim 1, wherein the parameter interface component object permits a user to control a physical characteristic.

4. The computer readable medium of claim 1, wherein the parameter interface component object permits a user to control rendering performance or image quality.

5. The computer readable medium of claim 1, further comprising the step of determining that the first annotation further includes a default value for the first shader parameter when the parameter interface component object is instantiated.

6. The computer readable medium of claim 1, wherein the shader source code is contained in a dynamic linkable library.

7. A method for dynamically configuring a user interface for a shader, comprising:
identifying shader source code representing the shader that includes shader parameters and annotations associated with the shader parameters, wherein the annotations are ignored by a compiler configured to generate executable code corresponding to the shader source code;
identifying a first annotation associated with a first shader parameter included in the shader source code, wherein the first annotation specifies a color browser, spin box, slider, or selection box parameter interface component object;
determining that the first annotation includes a recognized parameter interface description string;
instantiating a parameter interface component object associated with the recognized parameter interface description string, wherein the parameter interface component object provides an interface through which a user can adjust a value associated with the first shader parameter; and
displaying the parameter interface component object in a parameter window within the user interface.

8. The method of claim 7, further comprising the step of receiving an input specifying the shader.

9. The method of claim 7, wherein the parameter interface component object permits a user to control a physical characteristic.

10. The method of claim 7, wherein the parameter interface component object permits a user to control rendering performance or image quality.

11. The method of claim 7, wherein the shader source code is contained in a dynamic linkable library.

12. The method medium of claim 7, further comprising the step of determining that the first annotation further includes a default value for the first shader parameter when the parameter interface component object is instantiated.

13. A system for dynamically configuring a user interface for a shader, the system comprising:
means for identifying shader source code representing the shader that includes shader parameters and annotations associated with the shader parameters, wherein the annotations are ignored by a compiler configured to generate executable code corresponding to the shader source code;
means for identifying a first annotation associated with a first shader parameter included in the shader source code, wherein the first annotation specifies a color browser, spin box, slider, or selection box parameter interface component object;
means for determining that the first annotation includes a recognized parameter interface description string;

means for instantiating a parameter interface component object associated with the recognized parameter interface description string, wherein the parameter interface component object provides an interface through which a user can adjust a value associated with the first shader parameter; and means for displaying the parameter interface component object in a parameter window within the user interface.

14. The system of claim 13, further comprising means for receiving an input specifying the shader.

15. The system of claim 13, further comprising means for receiving an input responsive to a user interaction with the parameter interface component object.

16. The system medium of claim 13, further comprising means for determining that the first annotation further includes a default value for the first shader parameter when the parameter interface component object is instantiated.

* * * * *